Dec. 4, 1962 P. R. AUERBACH 3,066,561
CHUCKING MACHINE
Filed Aug. 1, 1960 2 Sheets-Sheet 1

INVENTOR.
PHILIP R. AUERBACH
BY
Christie, Parker & Hale
ATTORNEYS.

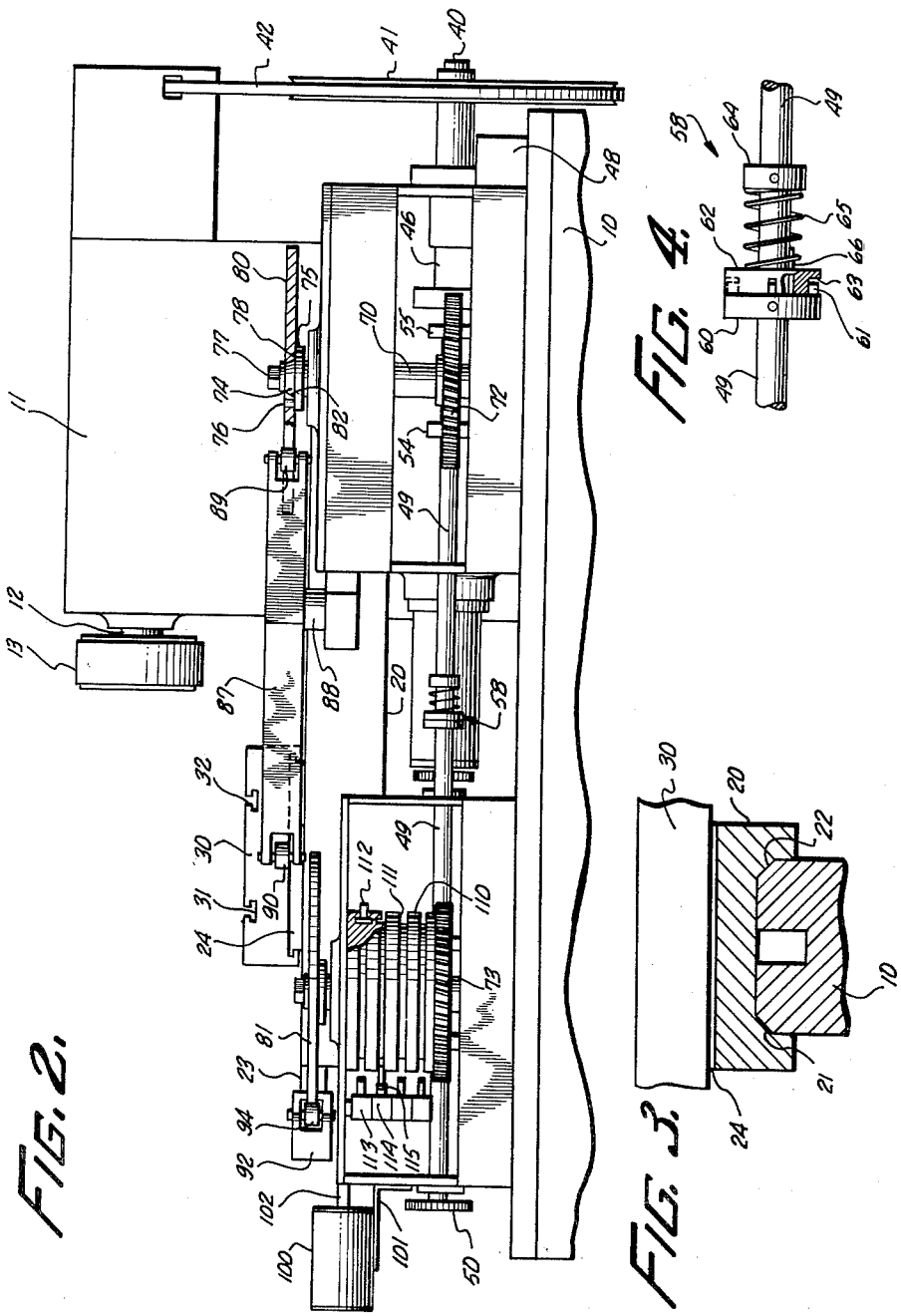

United States Patent Office 3,066,561
Patented Dec. 4, 1962

3,066,561
CHUCKING MACHINE
Philip R. Auerbach, North Hollywood, Calif., assignor to Robert R. Matousek, doing business as Automat Machine Co.
Filed Aug. 1, 1960, Ser. No. 46,521
1 Claim. (Cl. 82—19)

The invention relates to chucking machines and the like, particularly to automatically actuated slides for such machines and to apparatus for effecting such actuation.

Conventional chucking machines and lathes of the general type involved have a pair of slides slidably mounted on the machine for rectilinear movement concurrently in mutually perpendicular directions. Mechanism is provided in the machine which automatically actuates both slides concurrently with preselected rates of displacement for each slide. The mounting of the slides is such that the rates of displacement of the slides combine vectorially to produce a resultant displacement of the two slides which generates a desired geometrical line or curve relative to a chuck rotatably mounted on the machine in fixed position relative to the slides. The chuck is rotatively driven and releasably holds material which is to be given a desired geometrical shape. A cutting tool is mounted on one of the slides in such manner that it moves along the path generated by the vectorially combined rates of displacement of the two slides. When the material held in the chuck is rotated about the axis of rotation of the chuck and the slides actuated, the material is shaped according to the path followed by the cutting tool. As mentioned above, mechanism is provided which automatically actuates both slides concurrently and which permits the operator to preselect the rate of displacement of each slide.

Conventionally, this mechanism for actuating the slides and for selectively predetermining the rates of displacement thereof consists of a pair of cams, one for each slide, each of which is operatively connected to one of the slides. By resolving the line or curve which will give the desired shape to the material to be worked upon into rectangular, or "x" and "y," component rates of displacement and suitably shaping each of the cams to impart the proper rectangular component rate of displacement to the slide with which it is operatively connected, the slides will be actuated by the cams to jointly generate the desired line or curve.

For high precision work with machines of the above type, it is essential that there be a minimum of play in the cam and follower mechanism actuating the slides and that the motion to be imparted to each slide by one of the cams be transmitted from the cam to the slide without loss of motion so that there is precise movement of the two slides as previously programed on the cams. Also, it is important that there be precise phasing or coordination between the movements of the two cams so that the resultant displacement of the two slides will generate the desired line or curve. These requisites have created problems in conventional machines. There may be play in the actuating mechanism which cannot be removed. Conventionally, it is not possible, after the cams have been made and mounted on the machine, to vary the phase relationship between the cams and selectively fix it to achieve correct phasing or coordination of the movements of the cams. Another problem of considerable importance in conventional machines is cam follower mechanism for transmitting motion from the cam to the slide which absorbs small amounts of motion imparted to it by the cam and therefore does not precisely transmit to the slide the motion received from the cam. This absorption of motion by the cam follower may be due to play therein and also, it has been discovered, to deflection of the follower itself. It has been found that in conventional machines of the type involved the cam followers receive motion from the cam in one plane and transmit it to the slide in another plane, thereby imposing a moment on the follower which is the principal cause of its deflection and consequent absorption of cam motion.

The invention solves the above problems by providing cam and follower mechanism for actuating the slides which permits the two cams to be selectively phased relative to each other and which provides cam follower mechanism which transmits uniplanarly the motion received from the cam to the slide with minimal play and deflection to effect precise transfer of motion from the cam to the slide actuated thereby.

The apparatus of the invention includes, broadly, separate actuating cams, one for each slide, moved synchronously by drive means which includes means for varying and selectively setting the phase relationship between the cams, and a cam follower for each cam which receives motion responsive to movement of the cam and transmits it uniplanarly to the slide actuated by that cam without play and with negligible deflection.

The invention will be fully understood from a reading of the following description thereof taken in conjunction with the accompanying drawings, in which:

FIG. 2 is an elevational view, partially in section, looking along the line 2—2 in FIG. 1;

FIG. 3 is a sectional view along the line 3—3 in FIG. 1; and

FIG. 4 is an enlarged detail view, partially in section, in the area 4—4 in FIG. 1.

Figure 1:
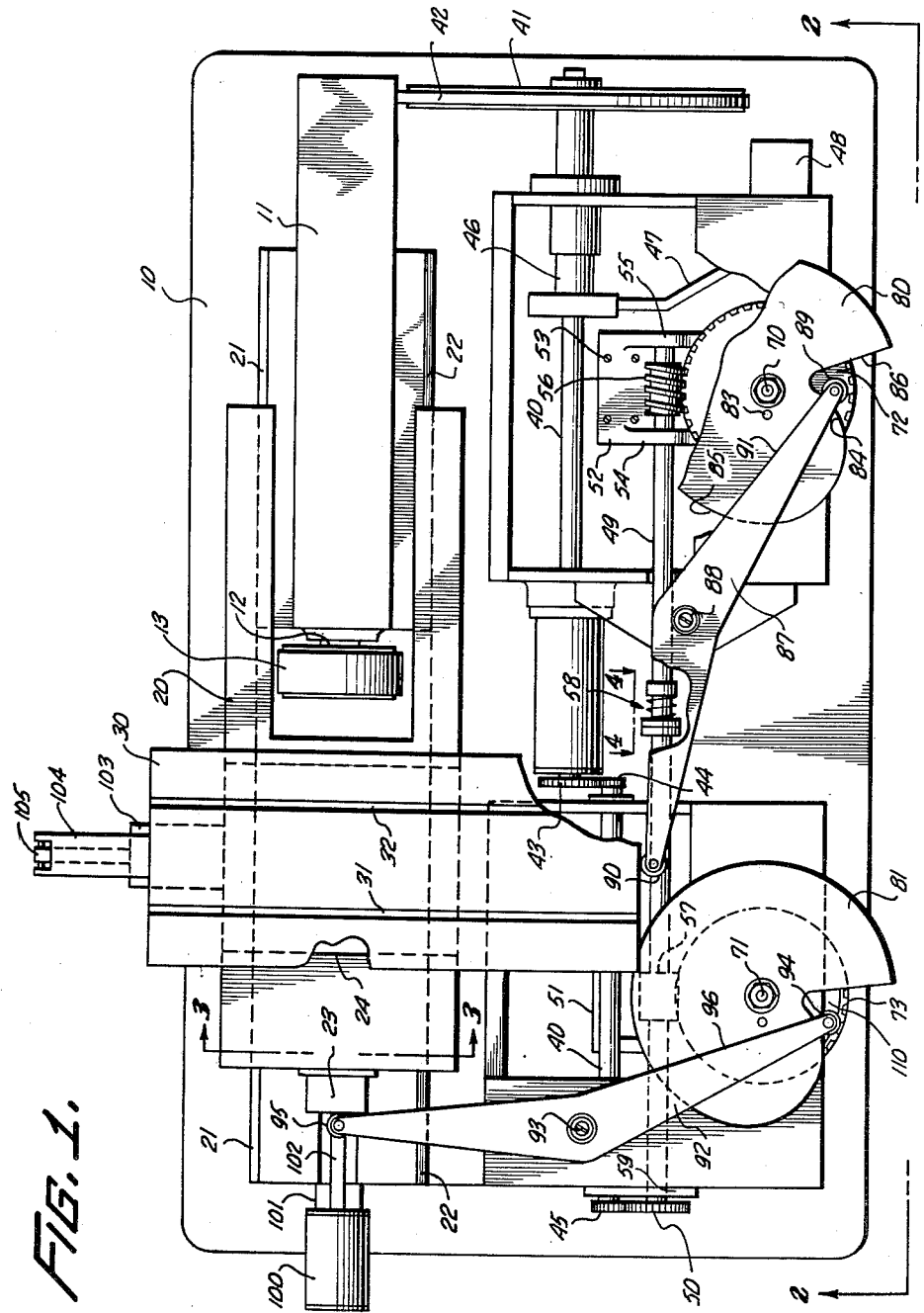
FIG. 1 is a plan view, partially broken away, of a chucking machine incorporating the invention.

Referring to FIG. 1, 10 designates the base or bed of a chucking machine embodying the invention. Mounted on the base 10 is a conventional lathe headstock in which a spindle 12 is journaled for rotation about a horizontal axis. The spindle is rotatively driven in conventional manner by a motor (not shown) within the base 10. Attached to the spindle is a conventional chuck 13 for releasably holding material to be worked upon for rotation of such material about the axis of rotation of the spindle 12.

A U-shaped longitudinal slide 20 is slidably mounted upon and keyed to the base 10 by means of ways 21, 22, as best shown in FIG. 3, for rectilinear sliding movement in a direction and also in a plane parallel to the axis of rotation of the spindle 12. Member 23 is affixed to and extends from one end of the longitudinal slide 20. A cross slide 30 is slidably mounted upon and keyed to the longitudinal slide 20 by means of a T-shaped section 24 fixed to the longitudinal slide for rectilinear sliding movement of the cross slide in a direction at right angles to the direction of movement of the longitudinal slide 20 and to the axis of rotation of the spindle 12 and in a plane parallel to the axis of rotation of the spindle. The longitudinal slide 20 and cross slide 30 are thus mounted for concurrent rectilinear movement in mutually perpendicular directions in such manner that the resultant movement of the cross slide 30 relative to the spindle 12 is the vector resultant of the rate of displacement of each slide. The cross slide 30 has parallel T-shaped keyways 31, 32 in it so that a conventional cutting tool holder or cutting tool turret (not shown) may be removably fixed to the cross slide 30 at any desired position.

A two piece offset drive shaft 40 is journaled in supports fixed to the base 10 and has at one end a drive pulley 41 which is rotatively driven synchronously with the spindle 12 by means of a drive belt 42 extending between the pulley 41 and a pulley (not shown) fixed to the spindle 12 within the headstock 11. Fixed to the other end of the drive shaft 40 is a driven gear 45 which is rotatively driven by the drive shaft. Intermediate the ends of the drive shaft 40 is a pair of meshed pick-off gears 43, 44, one of which is removably fixed to each offset end of each part of the drive shaft 40. The pick-off gears 43, 44 may be removed and replaced with other size gears as desired in order to obtain a desired rotational speed of the driven gear 45 at the end of the drive shaft. Adjacent the drive pulley 41 is a conventional cone clutch 46 which may be actuated to connect or disconnect the drive pulley 41 from the remainder of the drive shaft 40. The clutch 46 is actuated by means of a lever 47 which is moved to effect actuation of the clutch by means of a conventional solenoid 48.

Adjacent the drive shaft 40 is a two piece cam drive shaft 49 which is rotatably mounted on the base 10 by means of a pair of identical mounts 51, 52 which are releasably fixed to the base 10 by means of screws, such as the screw 53 in the mount 52, passing through holes in the mount which are slightly elongated in a direction transverse to the axis of the cam drive shaft. Each mount 51, 52 has a pair of upstanding flanges 54, 55 in which the journaling is effected. Except for a bearing at 59, clearance is provided between the cam drive shaft 49 and the members of the base 10 which it is shown as passing through for the purpose described below. A gear 50 is removably fixed to one end of the cam drive shaft 49 in mesh with the gear 45 on the drive shaft 40 to be rotatively driven thereby and thus to drive rotatively the cam drive shaft 49. The pair of gears 45, 50 form a second set of pick-off gears similar in purpose and operation to the set of pick-off gears 43, 44 described above. Identical worms 56, 57 are fixed to the cam drive shaft between the flanges of each mount 51, 52 and are rotatively driven by the cam drive shaft.

A pair of identical camshafts 70, 71 are each journaled in the base 10 for rotation about a vertical axis. Each camshaft 70, 71 has fixed to it a worm wheel 72, 73, respectively, which meshes with the worms 56, 57, respectively, fixed to the cam drive shaft 49 to rotatively drive the camshafts. Since the mounts 51, 52 are releasably attached to the base 10 with screws passing through elongated holes and since there is clearance between the cam drive shaft 49 and the other members of the base through which it passes, it is thus possible to release the mounts and move them transversely of the axis of the cam drive shaft to adjust the mesh between the worm and worm wheel on each camshaft and thus to effect a tight mesh without play. This is of importance to the proper functioning of the machine because play between the worms and worm wheels would permit the cams to vary in phase relationship so that the resultant motion of the slides 20, 30 would not be precisely that desired.

Mounted between the worms 56, 57 on the opposed, axially aligned intermediate ends of each part of the cam drive shaft 49 is a clutch 58 which permits engagement and disengagement of the two parts of the cam drive shaft 49 so that the phase relationship or coordination of the cams mounted on the camshafts 70, 71 may be varied and selectively fixed in a desired relationship by means of engaging the clutch 58. The clutch 58 is shown in greater detail in FIG. 4. A fixed collar 60 is fixed to an end of one part of the cam drive shaft 49 for rotation therewith and has four lugs projecting from its face, such as the lug 61, which are spaced ninety degrees apart about its periphery. On the adjacent axially aligned end of the other part of the shaft 49, a sliding collar 62 is slidably mounted by means of an axially extending key 66 for rotation with the shaft and also sliding movement on the shaft in the direction of the axis of rotation thereof. The sliding collar 62 has notches in its periphery, such as the notch 63, which are spaced ninety degrees apart and which mate with the lugs on the fixed collar 60, so that when the lugs on the fixed collar engage in the notches in the sliding collar, the two parts of the cam drive shaft are locked together for rotation as a single shaft. A stop collar 64 is fixed to the shaft 49 by means of a set screw or the like in spaced relation to the sliding collar 62. Disposed between the stop collar 64 and the sliding collar 62 is a compression spring 65 which biases the clutch to engaged condition. When it is desired to vary the phasing of the cams, the sliding collar 62 is moved axially of the shaft 49 to disengage the lugs from the notches. The cams may then be rotated relative to each other and locked in a desired phase relationship by releasing the sliding collar 62 and thus permitting the compression spring 65 to return the clutch to engaged condition. Because the lugs and notches are spaced ninety degrees apart, the varying of the phase relationship between the two cams must be in increments of ninety degrees with respect to rotation of the cam drive shaft, but due to the very large reduction between the worms and the worm wheels, this permits sufficiently fine adjustment of the phasing between the two cams.

Each camshaft 70, 71 extends above its uppermost journal and terminates in structure which is identical for each so that a description of one will suffice for both. As shown in FIG. 2, the camshaft 70 terminates in a seating cone 74 which extends upwardly from a flange 75. The surface of the seating cone 74 is concentric with the axis of rotation of the camshaft, and the seating flange 75 has a horizontally disposed seating face 78 extending from the base of the seating cone. A keying pin 76 is fixed to and extends vertically from the seating face 78. The camshaft extends upwardly beyond the seating cone and threadedly receives a nut 77 thereon.

A first disk cam 80 is removably mounted on the cam shaft 70, and a second disk cam 81 is in similar manner removably mounted on cam shaft 71. The cams 80, 81 are mounted on their respective camshafts in the same manner so that a description of one will suffice for both. As shown in FIG. 2, the cam 80 has a conical seating face 82 which mates with the conical seat 74 on the camshaft 70 so that when the cam is disposed on the camshaft with the mating conical faces in engagement, it is accurately centered on the camshaft and is free from play. The cam 80 also seats on the seating face 78, and the keying pin 76 registers in a mating hole 83 in the cam so that the cam is keyed or fixed to the camshaft for rotation therewith without rotational play between the cam and the camshaft. The nut 77 on the camshaft 70 removably holds the cam 80 in the seated engagement with the camshaft as described above. Each cam rotates in a horizontal plane and is vertically located so that its plane of rotation lies in the plane of movement of the slide which it actuates. Thus, as shown in FIG. 2, the plane of rotation of the cam 80 lies in the plane of rectilinear movement of the cross slide 30, and the plane of rotation of the cam 81 lies in the plane of rectilinear movement of the longitudinal slide 20. The periphery of each cam comprises its actuating surface and includes, as shown for the cam 80, an approach surface 84, a working surface 85, and a retreat 86.

A cam follower lever 87 is pivotally mounted at 88 on the base 10 with its plane of pivot lying in the plane of rotation of the cam 80 and the plane of rectilinear movement of the cross slide 30. At each end of the follower 87 is a rotatably mounted roll 89 or 90 which, respectively, engage the actuating surface of the cam 80 and the end of the cross slide 30 to transmit motion from the cam 80 to the cross slide 30. The follower 87 is a planar member, and its points of engagement between the roll 89 and the cam 80 and between the roll 90 and the cross slide 30 lie in the same plane and in the pivot plane of the follower. This relationship of the points of engagement between the follower lever 87 and the cam 80 and cross slide 30 falling in the same plane and in the pivot plane of the follower lever is of importance to the invention because it necessitates that the follower transmit uniplanar motion from the cam to the cross slide, that is, motion of the follower lying in a single plane, and thus eliminates any twisting moment on the follower tending to deflect it with consequent absorption of motion imparted to it by the cam 80. If the two points of engagement do not lie in the pivot plane of the follower lever 87, there would be a twisting moment imposed upon the follower lever which would result in the undesired absorption of motion by the follower. The follower lever 87 is slotted in the area 91 in order to accommodate the cam 80 with clearance between the cam and the sides of the slot. A second planar cam follower lever 92 which is functionally identical to the above described cam follower lever 87 is in similar manner pivotally mounted at 93 on the base 10 with its plane of pivot lying in the plane of rotation of the cam 81 and in the plane of rectilinear movement of the longitudinal slide 20 and extends between the cam 81 and the longitudinal slide 20 with a rotatably mounted roll 94 at one end engaging the actuating surface of the cam 81 and a second rotatably mounted roll 95 at the other end engaging the member 23 on the longitudinal slide 20. The relationship of the points of engagement of the follower lever 92 with the cam 81 and with the longitudinal slide 20 with respect to the pivot plane of the follower and with respect to each other is identical to that described above for the follower lever 87 and will not be repeated. The follower lever 92 is slotted in the area 96 to accommodate the cam 81 with clearance between the cam and the sides of the slot.

A first pneumatic piston and cylinder 100 is fixed to the base 10 by means of a support bracket 101 and has its piston connected to the longitudinal slide 20 in conventional manner by means of the piston rod 102. Pneumatic pressure is exerted continuously between the cylinder and the side of the piston from which the piston rod 102 extends to bias the member 23 on the longitudinal slide 20 against the roll 95 and also, through the pivotal mounting of the follower lever 92, to bias the roll 94 against the actuating surface of the cam 81. This biasing is necessary in order that there will be a precise transfer of motion from the cam 81 to the longitudinal slide 20 by means of the follower lever 92 without loss of motion due to play between either end of the follower lever and the surface against which its roll 94 or 95 bears. In similar manner and for the same reason, a second pneumatic cylinder and piston 103 is mounted on and fixed to the longitudinal slide 20, and, by means of a bracket 104 to which its piston rod 105 is pivotally connected, effects a continuous biasing of the cross slide 30 against the roll 90 and also of the roll 89 against the actuating surface of the cam 80.

As shown in FIG. 2, the camshaft 71 has a cylindrical programing drum 110 fixed to it for rotation therewith. The programing drum 110 has a plurality of vertically spaced identical circumferential T-shaped grooves, each of which lies in a single diametrical plane of the drum, such as the groove 111 shown in breakaway in FIG. 2. Actuating fingers with T-heads, such as the finger 112, are slidably received in the grooves and with conventional means are releasably fixed to the drum while disposed in such grooves, so that the finger or fingers disposed in each groove may be moved therein to a desired location and releasably fixed in such location. A plurality of limit switches, such as the switches 113 and 114, are mounted vertically on base 10 with each switch having its actuating arm, such as the arm 115 for the switch 114, aligned with an adjacent circumferential groove in the programing drum. The actuating fingers in the grooves extend from the exterior surface of the drum sufficiently to contact the switch actuating arm aligned with the groove, and thus actuate the switch when the actuating finger passes the actuating arm, as for the switch 114 shown in actuated position. The switches are electrically connected to control apparatus for controlling various functions of the machine, such as spindle speed, operation of the clutch 46, cycling of a turret tool holder, etc., in conventional manner. Since the programing drum 110 is fixed to the camshaft 71, it revolves synchronously with the cams, and by means of the movability of the actuating fingers on the programing drum permits the various functions which the switches control to be performed cyclically according to a preselected sequence with reference to each other and to the synchronous movement of the cams 80, 81.

The actuating surface of each of the cams 80, 81 is designed in conventional manner so that the movement imparted to the slide actuated by the cam represents the proper rectangular component of the desired resultant motion of both slides relative to the spindle 12. In this manner, the curve or line of any surface of revolution which may be resolved into rectangular coordinates may be programed into the cams and, by means of a cutting tool mounted on the cross slide 30, imparted to material held in chuck 13 and rotated about the axis of rotation of spindle 12. It is necessary, of course, to make a separate pair of cams for each resultant curve desired and to removably mount them on the camshafts as described above for the cams 80, 81.

It is to be understood that within the scope of the invention the cam and cam follower structure may be varied from that shown and described above so long as there is retained the essential feature of the points of engagement of the follower with the cam and with the slide which it actuates lying in the same plane and in the plane of movement of the follower so that there is no twist or deflection of the follower to absorb motion and thereby prevent an accurate and precise transfer of motion from the cam to the slide. For example, instead of pivotally mounted followers, a slidably mounted push rod follower extending between the slide and the actuating surface of the cam could be used. It is, however, an integral part of the invention that the cam follower or its equivalent be of such nature that it is possible to use a cam with an advance portion and a quick retreat portion, such as the advance portion 84 and the quick retreat portion 86 of the cam 80, so that the cutting tool is rapidly advanced into operative cutting position preliminarily to the cutting operation controlled by the working portion 85 of the cam and then, after performance of the cutting operation, is quickly moved away from the work to effect a quick cessation of cutting and to facilitate removal of the work from the chuck 13. It is also important that the cams be arranged so that the phasing of their motion may be varied and selectively preset, as permitted by the separate camshafts and clutch 58 in the embodiment described above.

It is further to be understood that the details described above may be modified within the scope of the appended claim without departing from the concept of the invention.

I claim:

In a chucking machine, a base, means rotatably mounted on the base for holding releasably a member and rotating it about its axis of rotation, a first slide movably mounted on the base for rectilinear movement, a second slide movably mounted on the first slide for rectilinear movement in a direction at right angles to the direction of movement of the first slide, at least one of said slides having a direction of movement at right angles to the axis of rotation of the means for holding, a first cam rotatably mounted on the base, a second cam rotatably mounted on the base, means for rotating the first and second cams synchronously, a first planar follower lever pivotally mounted on the base for planar movement about its pivot axis engaging the first cam and first slide at points lying in its plane of movement for uniplanarly receiving motion responsive to rotation of the first cam and transmitting it uniplanarly to the first slide, a second planar follower lever pivotally mounted on the base for planar movement about its pivot axis engaging the second cam and the second slide at points lying in its plane of movement for uniplanarly receiving motion responsive to rotation of the second cam and transmitting it uniplanarly to the second slide, means for biasing the first slide and the first cam against the first follower, means for biasing the second slide and the second cam against the second follower, a plurality of switches mounted on the base, and means rotating synchronously with the cams for actuating each of the plurality of switches according to a preselected sequence relative to rotation of the cams.

References Cited in the file of this patent

UNITED STATES PATENTS

| | | |
|---|---|---|
| 2,225,409 | Bromley | Dec. 17, 1940 |
| 2,720,130 | Chang | Oct. 11, 1955 |